United States Patent
Chen-Keat et al.

(10) Patent No.: US 10,062,202 B2
(45) Date of Patent: Aug. 28, 2018

(54) SYSTEM AND METHODS OF GENERATING A COMPUTER MODEL OF A COMPOSITE COMPONENT

(71) Applicant: General Electric Company, Schenectady, NY (US)

(72) Inventors: Teresa Tianshu Chen-Keat, Niskayuna, NY (US); Li Zheng, Niskayuna, NY (US); Nicholas Joseph Kray, Blue Ash, OH (US); Pinghai Yang, Niskayuna, NY (US); Ruben Egberto Fairman, Forest Park, OH (US); Michael Scott Hartle, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 696 days.

(21) Appl. No.: 14/579,200

(22) Filed: Dec. 22, 2014

(65) Prior Publication Data
US 2016/0179984 A1   Jun. 23, 2016

(51) Int. Cl.
*G06T 17/00* (2006.01)
*G06F 17/50* (2006.01)
*B29C 70/30* (2006.01)

(52) U.S. Cl.
CPC .......... *G06T 17/00* (2013.01); *G06F 17/5018* (2013.01); *B29C 70/30* (2013.01); *G06F 2217/44* (2013.01)

(58) Field of Classification Search
None
See application file for complete search history.

(56) References Cited

U.S. PATENT DOCUMENTS 4,849,913 A   7/1989 Ward et al.
4,938,824 A   7/1990 Youngkeit
(Continued)

FOREIGN PATENT DOCUMENTS

KR   20120070110 A   6/2012

OTHER PUBLICATIONS

Rasdorf et al., "A design environment for laminated fiber-reinforced thick composite materials", Engineering with Computers, Springer Link, Mar. 1, 1993, pp. 36-48,vol. 9, Issue 1, Springer-Verlag.
(Continued)

*Primary Examiner* — Kibrom K Gebresilassie
(74) *Attorney, Agent, or Firm* — GE Global Patent Operation; John Darling

(57) ABSTRACT

A method for generating a computer model of a composite component includes generating a surface mesh based on a ply drop region and a ply curved surface and generating node data including a plurality of node points relative to the ply drop region. The method also includes receiving composite data relating to a plurality of composite plies and generating a three dimensional model based on the composite data. The method further includes receiving layup table information and applying the node data, based on the layup table information, to generate a curve through a center of the surface mesh to define a plurality of element sets. The method also includes receiving composite draping data and determining, based on the draping data, where each element set intersects the three dimensional model. The method also includes analyzing an angle deviation of the plies based on the intersection of the element sets.

15 Claims, 11 Drawing Sheets

(56) References Cited

U.S. PATENT DOCUMENTS

| | | | |
|---|---|---|---|
| 5,006,990 A | 4/1991 | Ward et al. | |
| 5,497,451 A | 3/1996 | Holmes | |
| 5,896,303 A | 4/1999 | Furkay et al. | |
| 5,984,511 A * | 11/1999 | Vasey-Glandon | G06F 17/50 345/420 |
| 6,078,869 A | 6/2000 | Gunasekera | |
| 6,256,039 B1 | 7/2001 | Krishnamurthy | |
| 6,285,372 B1 | 9/2001 | Cowsar et al. | |
| 6,341,261 B1 | 1/2002 | Vasey-Glandon et al. | |
| 6,445,390 B1 | 9/2002 | Aftosmis et al. | |
| 7,010,472 B1 * | 3/2006 | Vasey-Glandon | G06F 17/50 700/97 |
| 7,099,725 B2 | 8/2006 | Murrish et al. | |
| 7,538,764 B2 | 5/2009 | Salomie | |
| 7,617,873 B2 | 11/2009 | Lovell et al. | |
| 7,671,858 B1 | 3/2010 | Staten et al. | |
| 7,747,305 B2 | 6/2010 | Dean et al. | |
| 7,809,531 B2 * | 10/2010 | Murrish | G06F 17/50 703/1 |
| 8,108,058 B2 | 1/2012 | Murrish et al. | |
| 8,113,284 B2 | 2/2012 | Jee et al. | |
| 8,620,627 B2 * | 12/2013 | Nakhle | G06F 17/5095 703/1 |
| 8,751,197 B2 * | 6/2014 | Burgos Gallego | G06F 17/50 703/1 |
| 8,862,437 B1 * | 10/2014 | Rassaian | G06F 17/5009 703/1 |
| 9,582,616 B2 * | 2/2017 | Carrera | B29C 61/10 |
| 2005/0119774 A1 * | 6/2005 | Murrish | G06T 19/00 700/98 |
| 2005/0163975 A1 * | 7/2005 | Chen | B29C 70/30 428/192 |
| 2006/0029807 A1 | 2/2006 | Peck | |
| 2007/0005527 A1 * | 1/2007 | Parthasarathy | G06F 17/5018 706/15 |
| 2007/0215345 A1 | 9/2007 | Lafferty et al. | |
| 2007/0236354 A1 * | 10/2007 | Green | B29C 70/30 340/572.8 |
| 2007/0242067 A1 * | 10/2007 | Sharma | G06T 17/20 345/423 |
| 2007/0244590 A1 * | 10/2007 | Menayo | B29C 70/54 700/98 |
| 2008/0083308 A1 * | 4/2008 | Evans | B26D 3/02 83/13 |
| 2009/0112820 A1 * | 4/2009 | Kessel | G06F 17/5009 |
| 2009/0112973 A1 * | 4/2009 | Kessel | G06F 17/50 709/203 |
| 2009/0218094 A1 | 9/2009 | McLeod et al. | |
| 2010/0042243 A1 * | 2/2010 | Burgos Gallego | G06F 17/50 700/98 |
| 2010/0173143 A1 * | 7/2010 | Beraud | B29B 11/16 428/299.4 |
| 2011/0143082 A1 * | 6/2011 | Fritz | B29C 70/34 428/77 |
| 2011/0218785 A1 | 9/2011 | Nouxet et al. | |
| 2012/0109594 A1 * | 5/2012 | Grape | G06F 17/5095 703/1 |
| 2013/0135302 A1 | 5/2013 | Bonner et al. | |
| 2015/0106062 A1 * | 4/2015 | Chen-Keat | G06F 17/50 703/1 |
| 2015/0370923 A1 * | 12/2015 | Chen-Keat | G06F 17/50 703/1 |
| 2016/0224698 A1 * | 8/2016 | Rassaian | G06F 17/5018 |
| 2017/0087779 A1 * | 3/2017 | Rassaian | B29C 70/30 |

OTHER PUBLICATIONS

P. Baker, "Integrated approach to finite element analysis of advanced composite structures", Computer-Aided Design, Science Direct, Sep. 1989, pp. 441-446, vol. 21, Issue 7.

Chen et al., Appendix B: Simulation of the Blade Manufacturing Process, Final Technical Report, Effect of Manufacturing-Induced Defects on Reliability of Composite Wind Turbine Blades, University of Massachusetts Lowell, U.S. Department of Energy Award No. DE-EE0001374, Aug. 31, 2012, retrieved from http://www.uml.edu/docs/DOE_DE-EE0001374_AppendixB_tcm18-139820.pdf (22 pgs).

P. Dhurvey et al., "Finite Element Analysis of Internally Ply Drop-off Composite Laminates," International Journal of Engineering Research, vol. 1, Issue No. 1, Nov. 1, 2012, pp. 12-16.

Vidyashankar, B. R. et al., "Analysis of laminates with ply drops." Composites science and technology 61.5 (2001): 749-758.

P. Dhurvey et al., "Review on Various Studies of Composite Laminates With Ply Drop-Off," ARPN Journal of Engineering and Applied Sciences, vol. 8, No. 8, Aug. 2013, pp. 595-605.

J. Berge et al., "Spring Orthosis Analysis—Finite element modeling and optimization of a composite material," 2010, retrieved from http://publications.lib.chalmers.se/records/fulltext/134182.pdf (88 pgs).

Zhao, et al., Prediction of Assembly Variation During Early Design, Journal of Computing and Information Science in Engineering, Sep. 2009, pp. 031003-1-031003-11, vol. 9.

Hallett, et al., Testing and Modelling of a Severely Tapered Composite Specimen, ACCIS, retrieved Oct. 28, 2013, pp. 28.

Weiss, et al., Influence of ply-drop location on the fatigue behaviour of tapered composites laminates, Science Direct, dated Mar. 2010, pp. 1105-1114.

Eck, et al., Automatic Reconstruction of B-Spline Surfaces of Arbitrary Topological Type, University of Darmstadt Microsoft Research, dated 1996, pp. 325-334.

Ma, et al., Parameterization of randomly measured points for least squares fitting of B-spline curves and surfaces, Butterworth Heinemann, dated 1995, vol. 27, No. 9, pp. 13.

Joy, et al., Boundary Determination for Trivariate Solids, Center for Image Processing and Integrated Computing (CIPIC), dated 1999, pp. 10.

Yang, et al., A B-spline based approach to heterogeneous objects design and analysis, ScienceDirect, dated 2006, pp. 95-111.

Chen, et al., Modelling and computer-aided design of 3D hollow woven reinforcement for composites, The University of Manchester, dated 2006, vol. 97, No. 1, pp. 79-87.

* cited by examiner

SYSTEM AND METHODS OF GENERATING A COMPUTER MODEL OF A COMPOSITE COMPONENT

BACKGROUND

The embodiments described herein relate generally to computer modeling, and more particularly, to systems and methods for generating a computer model of a composite component having a plurality of composite plies.

Composite laminate components generally include a plurality of layers or plies of composite material assembled together to provide the composite component with improved engineering properties. Composite components are typically manufactured by assembling a plurality of plies one on top of the other within a suitable tool or mold until a required thickness and shape is achieved. However, depending on the desired configuration of the component being manufactured, it may be necessary to drape the plies to taper the thickness of the plies. As such, the plies are angled in the third, or depth dimension, as compared to laying the plies on a flat surface in two dimensions. For example, thickness tapering may be required to create a component having a desired surface contouring or shape. To provide such thickness tapering, one or more shortened or terminated plies are typically introduced at various locations within the laminate to form ply drops. Each ply drop generally represents a step-reduction in the thickness of the laminate, thereby permitting a laminate material to taper from a thicker cross-section to a thinner cross-section.

The draping should be organized and represented on a computer ply model for subsequent manufacturing in order to layup and manufacture the composite component. In the design stage of the composite components, computer aided design (CAD) models of the plies and ply drops are sometimes generated. A typical CAD system may allow a user to construct and manipulate complex three dimensional (3D) models of objects or assemblies of objects. Moreover, the CAD system may provide a representation of modeled objects using edges or lines, which may be represented in various manners, e.g., non-uniform rational B-splines.

Current CAD systems provide an approximate representation of the ply surface, ply boundary, and associated curved or contoured surfaces, edges, and lines. Conventional CAD systems, however, may not accommodate for draping information such as, e.g., nominal manufacturing layup sequence, material property information, draping effects induced by ply angle deviation, and automated fiber placement tow path-based ply angles. Moreover, current computer modeling software may not accurately apply non-homogenous composite properties in relative simulations. Still further, some current computer modeling software may not be able to efficiently receive and/or apply composite information from a variety of sources such as, e.g., a layup table, a material look-up table, and draping software. More particularly, current computer modeling software may not be able to apply composite information relating to the number of composite plies, ply fiber orientation, ply thickness, and ply material identification to facilitate accurately simulating component mechanical behavior.

Moreover, manufacturing processes for the physical composite component based on a typical 3D computer model may lead to manufacturing inaccuracies that may further lead to embedded manufacturing deficiencies for the composite laminates since details, such as draping areas, may not be properly defined in the modeling stage. Inaccurate computer modeling may lead to machine tool head collision with the composite laminate and/or an undesired tool path generation.

BRIEF DESCRIPTION

In one aspect, a computer-implemented method for generating a computer model of a composite component using a computing device is provided. The computer includes at least one processor coupled to a memory device. The composite component has a base surface and a predefined ply curved surface formed by a ply of a plurality of composite plies, each ply of the plurality of composite plies having a ply thickness. The method includes defining a ply drop region of the base surface and generating a surface mesh based on the ply drop region and the ply curved surface. The method also includes generating node data including a plurality of node points relative to the ply drop region and receiving composite data relating to the plurality of composite plies. The method further includes generating a three dimensional model based on the composite data and receiving layup table information. The method also includes applying the node data, based on the layup table information, to generate a curve through a center of the surface mesh to define a plurality of element sets. The method further includes receiving composite draping data and determining, based on the draping data, where each element set of the plurality of element sets intersects the three dimensional model. The method also includes analyzing an angle deviation of a ply of the plurality of plies based on the intersection of the element sets.

In another aspect, a computing device for generating a computer model of a composite component is provided. The composite component includes a base surface, a ply curved surface, and a plurality of composite plies. The computing device includes a memory device configured to store a characteristic of the composite component and an interface coupled to the memory device and configured to receive the characteristic of the composite component. The computing device also includes a processor coupled to the memory device and the interface device. The processor is configured to define a ply drop region of the base surface and generate a surface mesh based on the ply drop region and the ply curved surface. The processor is also configured to generate node data including a plurality of node points relative to the ply drop region and receive composite data relating to the plurality of composite plies. The processor is further configured to generate a three dimensional model based on the composite data and receive layup table information. The processor is also configured to apply the node data, based on the layup table information, to generate a curve through a center of the surface mesh to define a plurality of element sets. The processor is further configured to receive composite drape data and determine, based on the drape data, where each element set of the plurality of element sets intersects the three dimensional model. The processor is also configured to analyze an angle deviation of a ply of the plurality of plies based on the intersection of the element sets.

In a further aspect, one or more non-transitory computer-readable storage media having computer-executable instructions embodied thereon for generating a computer model of a composite component, the composite component having a base surface, a ply curved surface, and a plurality of composite plies using a computer having a memory device and a processor, wherein when executed by the processor, the computer-executable instructions cause the processor to define a ply drop region of the base surface and generate a surface mesh based on the ply drop region and the ply curved surface. The computer-executable instructions also cause the processor to generate node data include a plurality of node points relative to the ply drop region and receive composite data relating to the plurality of composite plies. The computer-executable instructions further cause the processor to generate a three dimensional model based on the composite data and receive layup table information. The computer-executable instructions also cause the processor to apply the node data, based on the layup table information, to generate a curve through a center of the surface mesh to define a plurality of element sets. The computer-executable instructions further cause the processor to receive composite drape data and determine, based on the drape data, where each element set of the plurality of element sets intersects the three dimensional model. The computer-executable instructions also cause the processor to analyze an angle deviation of a ply of the plurality of plies based on the intersection of the element sets.

DRAWINGS

These and other features, aspects, and advantages will become better understood when the following detailed description is read with reference to the accompanying drawings in which like characters represent like parts throughout the drawings, wherein.

Figure 1:
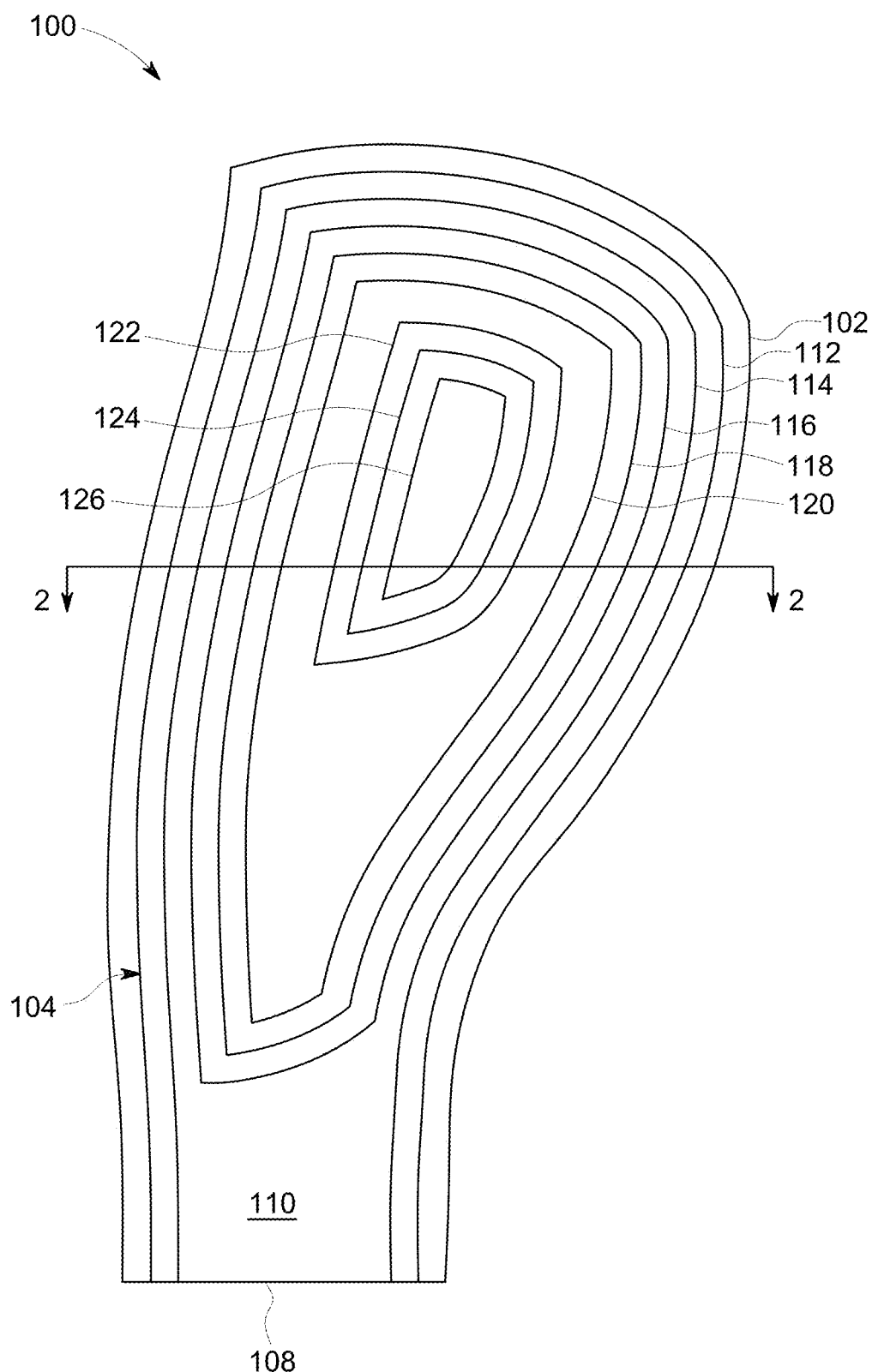
FIG. 1 is a plan view of an exemplary composite component having a plurality of composite plies.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein relate to a system and methods of generating computer models of composite components using a mathematical basis spline analysis ("B-spline analysis"). More particularly, the embodiments relate to methods, systems and/or apparatuses for generating a computer model of a composite component including geometry data, material data, and draping data, and also for applying the geometry data (i.e., the node data) to generate a curve through a surface mesh of the computer model to define a plurality of element sets, determining where each element set intersects the computer model using the draping data, and analyzing an angle deviation of a ply of the composite component based on the determined intersections. The embodiments described herein include a variety of types of composite components, and the descriptions and figures that utilize turbine blades are exemplary only.

FIG. 1 is a plan view of a composite component 100 having a plurality of plies 104. Composite component 100 is shown in FIG. 1 in simplified form to emphasize certain elements of component 100 discussed herein, and specifically, component 100 is shown from a top viewpoint and each ply 104 of component 100 is shown by outlining the ply's boundary (or perimeter). In the exemplary embodiment, composite component 100 is a turbine blade. Alternatively, composite component 100 may include other structures such as, but not limited to, vanes, rotors, and stators. Composite component 100 may include any structure having a laminate formation.

Composite component 100 includes a base surface 102, where the plurality of plies 104 of component 100 are arranged in a spaced relationship with respect to base surface 102. Base surface 102 includes a perimeter 108 and an internal surface area 110 defined by perimeter 108. The plurality of plies 104 includes a first ply 112, a second ply 114, a third ply 116, a fourth ply 118, a fifth ply 120, a sixth ply 122, a seventh ply 124, and an eighth ply 126. In some embodiments, component 100 may include less than eight plies or more than eight plies, i.e., composite component 100 may include any number of plies to enable component 100 to function as described herein.

Figure 2:
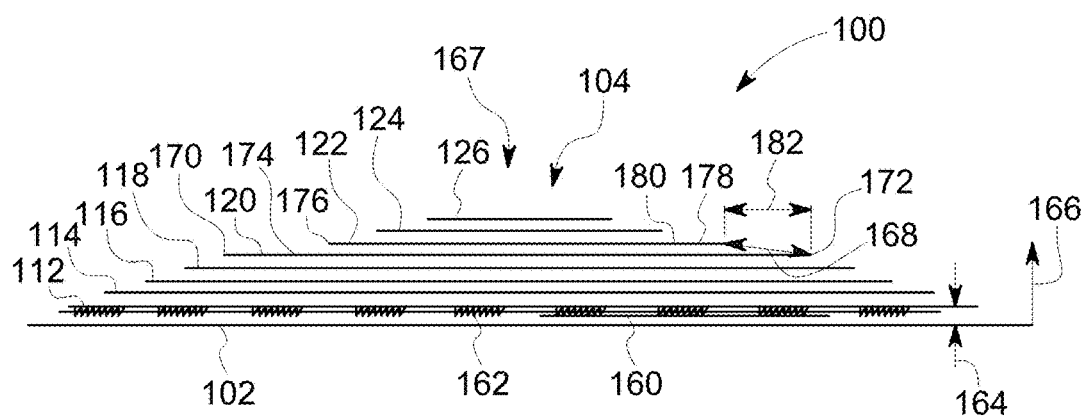
FIG. 2 is a cutaway view of the exemplary composite component shown in FIG. 1 taken along line 2-2.

FIG. 2 is an exemplary cutaway view of the composite component shown in FIG. 1 taken along line 2-2. In the exemplary embodiment, the composite component is shown with characteristics that may be provided in, e.g., a layup table. Composite component 100 includes plies 104 arranged in an ascending, spaced relationship with respect to base surface 102. In the exemplary embodiment, the plurality of plies 104 of composite component 100 includes plies 112, 114, 116, 118, 120, 122, 124, and 126. For plies 104, each ply includes a plurality of fibers 160 surrounded by and supported within a matrix resin 162. In the exemplary embodiment, fibers 160 and matrix resin 162 are only shown for ply 112 for clarity purposes. Fibers 160 are unidirectional and orientated within each ply in a longitudinal direction of component 100. Alternatively, fibers 160 may be multidirectional and orientated within each ply in a lateral direction of composite component 100. Each ply of composite component 100 has a ply thickness 164 as measured between adjacent plies. Ply thickness 164 for each ply may be the same or different depending on design criteria for composite component 100.

In the exemplary embodiment, plies 104 of composite component 100 are sequentially arranged in a layup direction 166 with respect to base surface 102. Layup direction 166 is normal to base surface 102. Alternatively, layup direction 166 can be in any orientation with respect to base surface 102. More particularly, when modeling (or manufacturing) composite component 100, base surface 102 is identified, and for each ply of component 100, according to layup direction 166, first ply 112 is coupled to base surface 102, second ply 114 is coupled to first ply 112, third ply 116 is coupled to second ply 114, fourth ply 118 is coupled to third ply 116, fifth ply 120 is coupled to fourth ply 118, sixth ply 122 is coupled to fifth ply 120, seventh ply 124 is coupled to sixth ply 122, and eighth ply 126 is coupled to seventh ply 124 so that plies 112, 114, 116, 118, 120, 122, 124 and 126 are sequenced in an ascending arrangement 167 as referenced from base surface 102.

To enable a step-reduction or incremental change in the overall thickness of composite component 100, each ply 104 of component 100 is draped to form at least one ply drop 168 within composite component 100. In the exemplary embodiment, ply drop 168 is formed between each adjacent ply. More particularly, according to layup direction 166, arrangement 167, and ply thickness 164, at least one ply drop 168 is formed between each ply 104 (e.g., plies 112-126) of composite component 100. In the exemplary embodiment, ply drop 168 is only shown for plies 120 and 122 for clarity purposes. Specifically, as shown in the exemplary embodiment, fifth ply 120 includes an end 170, another end 172, and a length 174 extending there between and sixth ply 122 also includes an end 176, another end 178, and a length 180 there between. In the exemplary embodiment, length 174 and length 180 correspond with the length of a cross-section of plies 120 and 122 and are generally associated with the relative size of plies 120 and 122. For example, length 180 is less than length 174. Alternatively, length 180 can be substantially the same or larger than length 174. Moreover, a ply drop distance 182 is defined between end 172 and end 178 based on at least the difference between length 180 and length 174.

Figure 3:
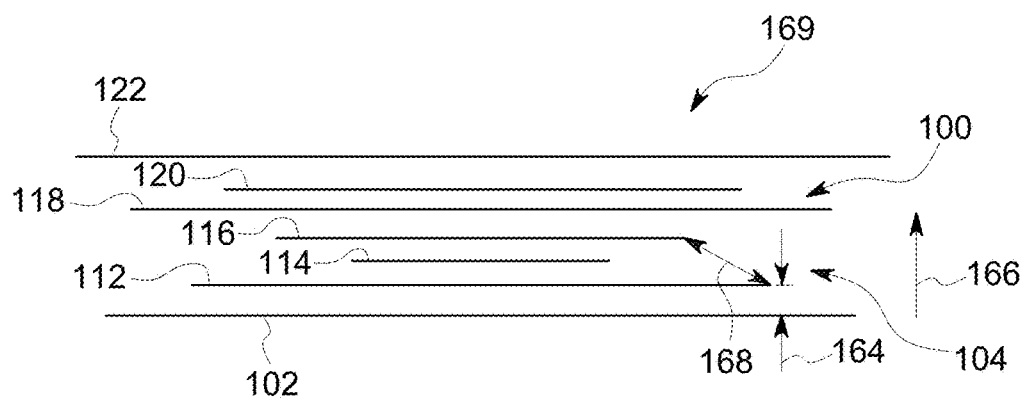
FIG. 3 is schematic view of another arrangement of the plurality of composite plies shown in FIG. 1.
Figure 4:
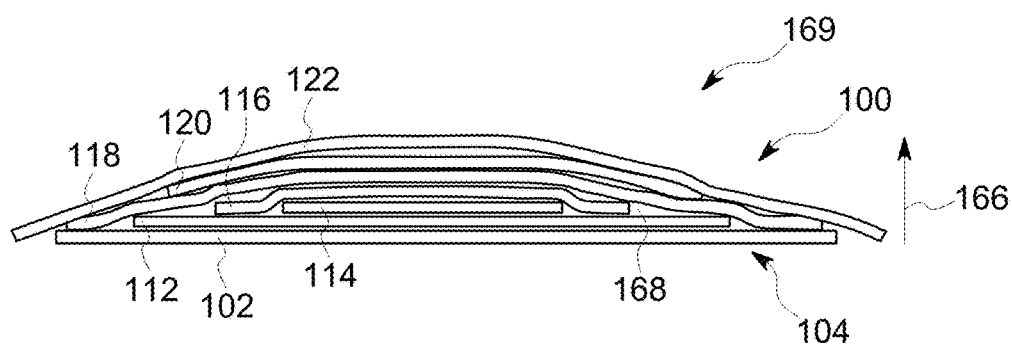
FIG. 4 is a side elevation view of an arrangement of the plurality of composite plies shown in FIG. 3.

FIG. 3 is a schematic view of another arrangement 169 of the plurality of composite plies 104 shown in FIG. 1. FIG. 4 is a side elevation view of arrangement 169 of the plurality of composite plies shown in FIG. 3. Referring to FIGS. 3 and 4, in the exemplary embodiment, composite component 100 includes arrangement 169 of plies 112, 114, 116, 118, 120, and 122. Plies 112-122 are sequentially arranged in layup direction 166 with respect to base surface 102. Layup direction 166 is normal to base surface 102. Alternatively, layup direction 166 can be in any orientation with respect to base surface 102. More particularly, when modeling (or manufacturing) composite component 100, base surface 102 is identified, and for each layer of composite component 100, according to layup direction 166, first ply 112 is coupled to base surface 102, second ply 114 is coupled to first ply 112, third ply 116 is coupled to second ply 114, fourth ply 118 is coupled to third ply 116, fifth ply 120 is coupled to fourth ply 118, and sixth ply 122 is coupled to fifth ply 120 so that plies 112-122 are sequenced in arrangement 169. The draping of each ply 104 of component 100 for arrangement 169 is different than for arrangement 167. For example, in arrangement 169, at least one ply drop 168 is formed internal to component 100. In some embodiments, the arrangement of plies 104 may be different from arrangements 167 and 169 depending on desired design criteria for composite component 100.

Figure 5:
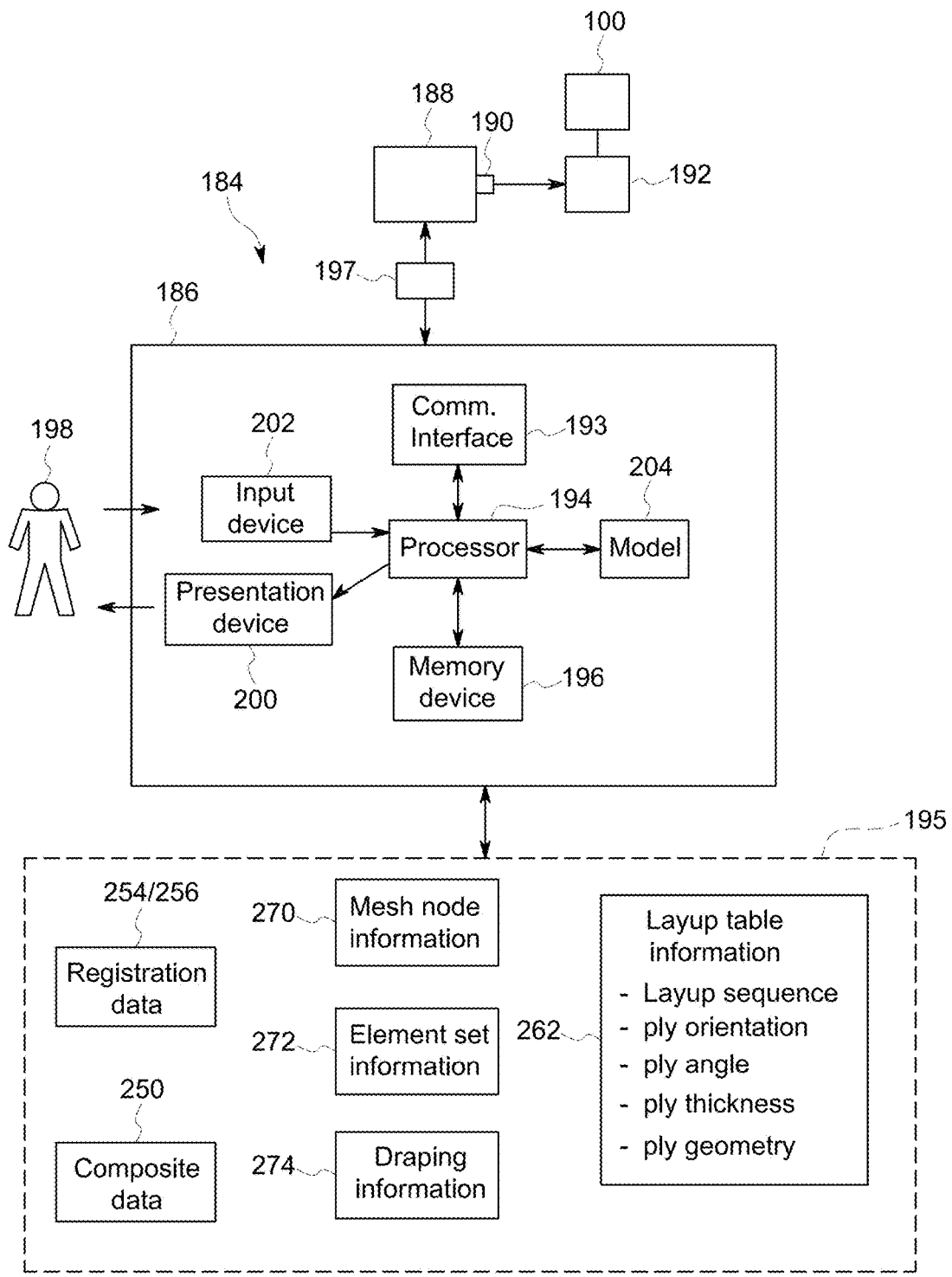
FIG. 5 is a block diagram illustrating an exemplary computing system having a computing device for use in computer modeling the composite component shown in FIGS. 1-4.

FIG. 5 is a block diagram illustrating a computing system 184 having a computing device 186 for use in computer modeling composite component 100 shown in FIGS. 1-4. System 184 includes a layup device 188 coupled with computing device 186. Layup device 188 includes a tool 190 and a mandrel 192. Computing device 186 includes a processor 194 and a memory device 196 coupled thereto. Processor 194 includes a processing unit, such as, without limitation, an integrated circuit (IC), an application specific integrated circuit (ASIC), a microcomputer, a programmable logic controller (PLC), and/or any other programmable circuit. Processor 194 may include multiple processing units (e.g., in a multi-core configuration). Computing device 186 is configurable to perform the operations described herein by programming processor 194. For example, processor 194 may be programmed by encoding an operation as one or more computer-executable instructions and providing the computer-executable instructions to processor 194 in memory 196. Memory 196 includes, without limitation, one or more random access memory (RAM) devices, one or more storage devices, and/or one or more computer readable media. Memory 196 is configured to store data, such as computer-executable instructions and characteristics, such as configuration characteristics (e.g., physical characteristics and/or manufacturing characteristics) of composite component 100. Memory 196 includes any device allowing information, such as computer-executable instructions and/or other data, to be stored and retrieved.

Computing device 186 also includes a communication interface 193. Communication interface 193 may include, among other possibilities, a web browser and/or a client application. Web browsers and client applications enable users to display and interact with media and other information. Exemplary client applications include, without limitation, a software application for managing one or more computing device 186. Communication interface 193 may further enable computing device 186 to communicate with external components (e.g., a remote data server) over a network (e.g., a wired or a wireless network).

Computing device 186 further includes at least one presentation device 200 communicatively coupled with processor 194 for presenting information to a user 198. Presentation device 200 is any component capable of conveying information to user 198. Presentation device 200 may include, e.g., a display device (not shown) (e.g., a liquid crystal display (LCD), organic light emitting diode (OLED) display, or "electronic ink" display) and/or an audio output device (e.g., a speaker or headphones). In some embodiments, presentation device 200 includes an output adapter (not shown), such as a video adapter and/or an audio adapter which is operatively coupled with processor 194 and configured to be operatively coupled with an output device (not shown), such as a display device or an audio output device.

Computing device 186 also includes an input device 202 communicatively coupled with processor 194 for receiving input from users such as user 198. Input device 202 includes, e.g., a keyboard, a pointing device, a mouse, a stylus, a touch sensitive panel (e.g., a touch pad or a touch screen), a gyroscope, an accelerometer, a position detector, and/or an audio input device. In some embodiments, a single component, such as a touch screen, may function as both an output device (e.g., presentation device 200) and an input device (e.g., input device 202). In other embodiments, computing device 186 may include components for enabling device 186 to be communicatively coupled to a network (not shown).

In the exemplary embodiment, computing device 186 is configured to use processor 194 to generate a computer model 204 of composite component 100 using, e.g., B-surface representation of plies 104 (shown in FIG. 1). Computing device 186 is configured to generate computer model 204 using algorithms, mathematical functions, and/or other appropriate means such as a non-uniform rational B-spline analysis (NURB analysis). Computer model 204 is configured to be compatible with various CAD software, in which the geometry is described in terms of features, such as, but not limited to, holes, lines, curves, chamfers, blends, radii, user defined shapes, shapes from shape libraries, and characteristics associated with, and between, these features. Computer model 204 is also configured to be compatible with other computer modeling software, e.g., software for analyzing mechanical stress and/or lifetime of composite components.

In generating computer model 204, computing device 186 is configured to receive input data 195 including data associated with composite component 100 and, more particularly, various characteristics of composite component 100. In the exemplary embodiment, input data 195 includes data associated with various characteristics of composite component 100 including, e.g., physical characteristics such as length, width, height, shape, material composition, and/or orientation. In some embodiments, input data 195 includes draping information associated with plies 104 of composite component 100. In other embodiments, input data 195 includes data associated with a lifting model (not shown) and/or a birdstrike model (not shown), both discussed further below. Computing device 186 receives input data 195 from sources (not shown) such as, e.g., and without limitation, other computer modeling and/or simulation software, layup tables, historical data from memory 196, and manually input data (e.g., input by user 198 using input device 202). Alternatively, computing device 186 may receive input data 195 from one or more of a storage device (not shown) resident within computing device 186 and an external storage device (not shown) in communication with computing device 186 (e.g., a data server). In some embodiments, computing device 186 is configured to store input data 195 within memory 196.

Computing device 186 is further configured to generate manufacturing data 197 for facilitating the manufacture of composite component 100. Computing device 186 transmits manufacturing data 197 to layup device 188. Layup device 188 is configured to control tool 190 based on manufacturing data 197 to apply manufacturing processes to one or more composite plies (not shown) coupled to mandrel 192 to facilitate forming composite component 100.

Figure 6:
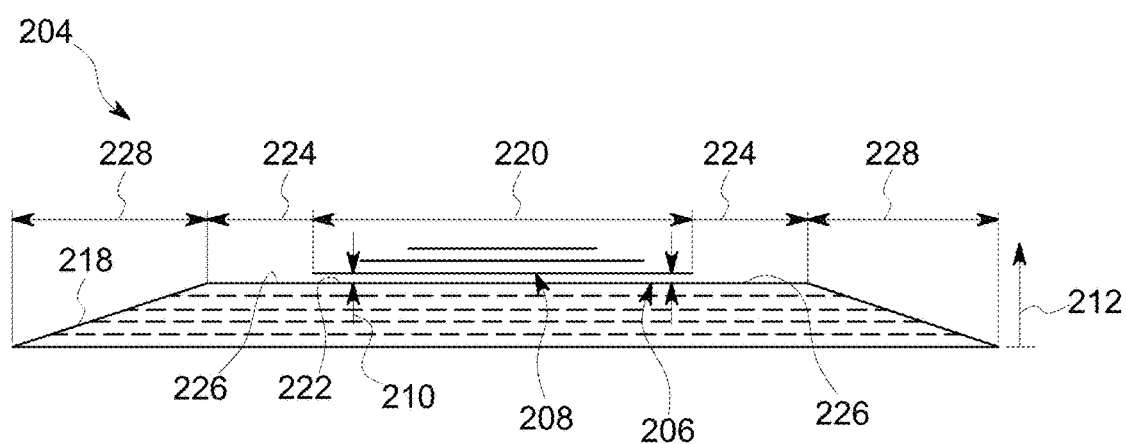
FIG. 6 is a side elevation view of an exemplary computer model of the composite component shown in FIGS. 1 and 2.
Figure 7:
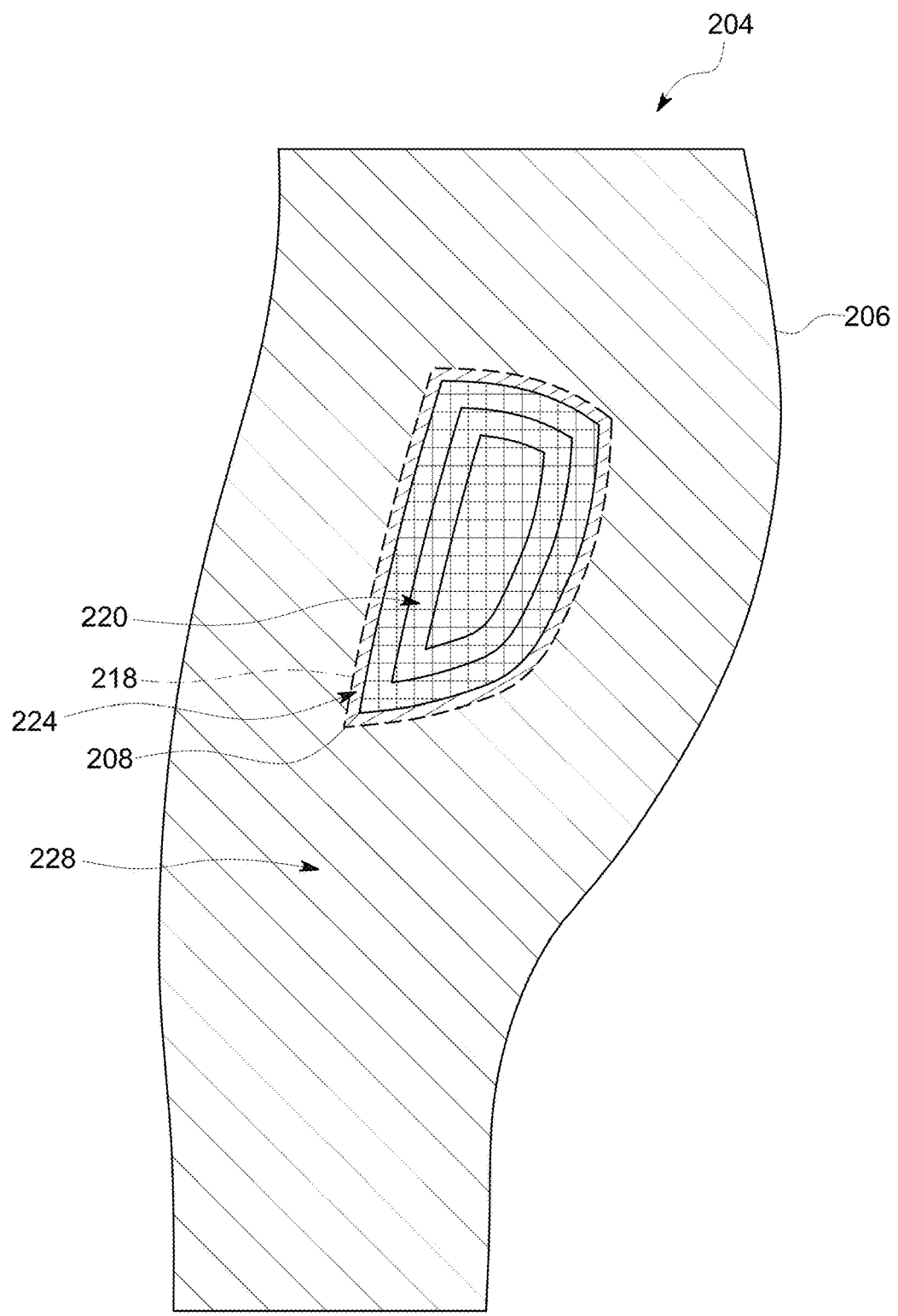
FIG. 7 is a schematic overhead view of the exemplary computer model shown in FIG. 6.

FIG. 6 is a side elevational view of computer model 204 of composite component 100 (shown in FIGS. 1 and 2) shown partially generated by computing device 186 (shown in FIG. 5). FIG. 7 is a schematic overhead view of computer model 204 of composite component 100. Referring to FIGS. 6 and 7, processor 194 (shown in FIG. 5) receives input data 195 associated with composite component 100 for generating computer model 204. Processor 194 is configured to determine a base surface 206 associated with the largest cross-sectional area of composite component 100. Processor 194 is also configured to generate a plurality of ply curved surfaces 208, each ply curved surface 208 associated with a ply thickness 210 (shown in FIG. 6). Ply curved surface 208 and relative ply thickness 210 are associated with plies 104 of composite component 100. More specifically, each ply curved surface 208 and ply thickness 210 are associated with a respective ply 104 (shown in FIGS. 1 and 2) of composite component 100. Base surface 206, ply curved surface 208, and ply thickness 210 are pre-defined from known design constraints based on at least one of a previous engineering analysis, a historical analysis, and a lookup table.

Computing device 186 is further configured to define a layup direction 212 that is normal to base surface 206.

Layup direction 212 identifies the direction in which plies 104 are to be applied with respect to base surface 206 when generating computer model 204. In some embodiments, layup direction 212 may be received by computing device 186 as part of input data 195. In other embodiments, layup direction 212 may be manually defined by user 198, e.g., using input device 202 (both shown in FIG. 5).

In generating computer model 204, computing device 186 is configured to sequentially apply each ply 104 of composite component 100 according to base surface 206, ply curved surfaces 208, ply thickness 210, and layup direction 212. More particularly, computing device 186 is configured to project each ply curved surface 208 onto base surface 206 according to layup direction 212. Moreover, computing device 186 is configured to offset each ply curved surface 208 outwardly from and along base surface 206 to define an offset ply curved surface 218. A ply region 220 is calculated by computing device 186 and includes a portion of an area 222 of base surface 206 that is interior of each ply curved surface 208. Moreover, a ply drop region 224 of base surface 206 is defined by computing device 186 and includes an area 226 of base surface 206 that is external of ply curved surfaces 208 and interior of offset ply curved surface 218. Still further, computing device 186 is configured to define an outer region 228 including a portion of the area of base surface 206 that is external of offset ply curved surface 218. In applying each ply 104 of composite component 100, area 222 of base surface 206 is extruded by a value expressed by ply thickness 210, and area 226 of base surface 206 is extruded by a value expressed as a function of the size of ply drop region 224. In the exemplary embodiment, this process is repeated for each ply curved surface and for each ply of composite component 100.

In some embodiments, computer simulation software is used to analyze a composite component to determine the mechanical performance, operational stresses, or other information associated with the component. A computer model (e.g., computer model 204) generated for the composite component (e.g., composite component 100) facilitates such analysis. In the exemplary embodiment, composite component 100 is analyzed by a computer simulation based on finite element analysis, and computing device 186 is configured to generate the relative finite element mesh using computer model 204.

Figure 8:
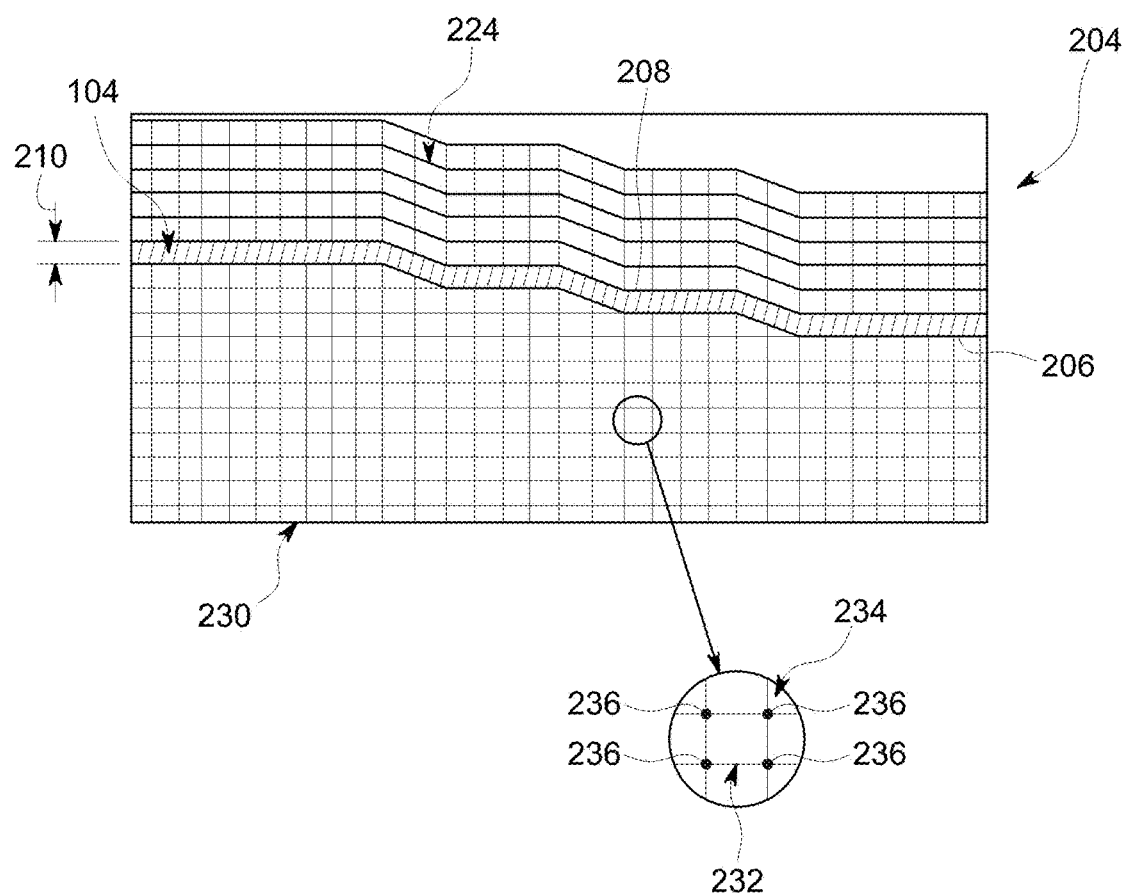
FIG. 8 is a schematic view of a portion of a surface mesh for the computer model of the composite component shown in FIG. 1.

FIG. 8 is a schematic view of a portion of a surface mesh 230 associated with computer model 204. In the exemplary embodiment, surface mesh 230 is a finite element mesh. Finite element mesh 230 is generated using computer model 204. Moreover, finite element mesh 230 includes a plurality of mesh elements 232, each element 232 defined by node data 234 identifying a plurality of nodes 236. In the exemplary embodiment, the configuration, orientation, and/or location of each element 232 are at least partially defined by the geometry of composite component 100 and its computer model 204. Finite element mesh 230 includes elements 232 for at least base surface 206, ply curved surface 208, offset ply curved surface 218, and discretized ply drop regions 224 throughout ply thickness 210 of each ply 104 of computer model 204. In some embodiments, computing device 186 is configured to receive node data 234 and generate plurality of nodes 236 using the received node data 234.

In analyzing a composite component (e.g., composite component 100) using computer simulation software, additional information associated the component may be included in the simulation, e.g., to enable enhanced cooperation among the various software used in the manufacturing process of the component, to enhance the resultant simulation, or to enhance the computer model of the component by incorporating the additional information therein (e.g., as part of the layup table). In the exemplary embodiments shown in FIGS. 9-11, such additional information is associated with various simulation software leveraged throughout the manufacturing process of the composite component and includes information associated with at least one of a lifting model, a bird strike model, and a layup table for the composite component.

Figure 9:
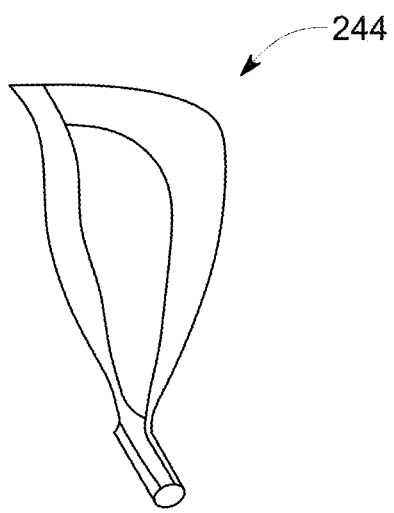
FIG. 9 is a unigraphical computer model of a composite component.
Figure 10:
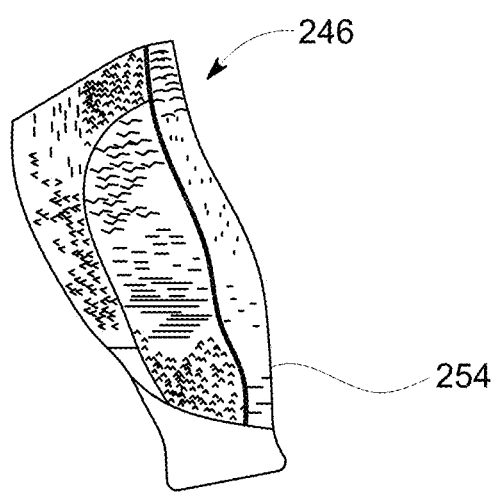
FIG. 10 is an exemplary computer model of the unigraphical computer model shown in FIG. 9 translated to a lifting model.
Figure 11:
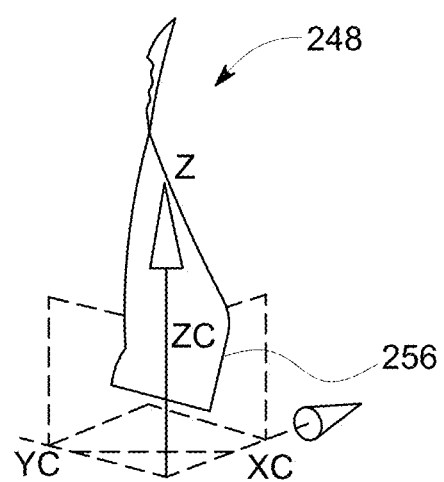
FIG. 11 is an exemplary computer model of the unigraphical computer model shown in FIG. 9 translated to a bird strike model.

FIG. 9 is a unigraphical computer model 244 of a composite component (e.g., composite component 100 shown in FIG. 1). FIG. 10 is a computer model 246 of unigraphical computer model 244 (shown in FIG. 9) translated to a lifting model, e.g., and without limitation, a model of a component that facilitates assessment of fatigue performance for given conditions and residual stress distribution. FIG. 11 is a computer model 248 of unigraphical computer model 244 (shown in FIG. 9) translated to a bird strike model, e.g., and without limitation, a model used for analyzing bird strikes on an aircraft component.

Referring to FIGS. 9-11, in the exemplary embodiment, computing device 186 receives input data 195 including composite data 250 (shown in in FIG. 5) associated with composite component 100. Composite data 250 includes, e.g., information associated with plies 104 (shown in FIG. 1) of composite component 100. Computing device 186 receives composite data 250 from sources (not shown) such as, e.g., and without limitation, other software, layup tables, historical data from memory 196, and manually input data. Alternatively, computing device 186 receives composite data 250 from any source, including, without limitation, one or more of storage devices (not shown) resident within computing device 186 and external storage devices (not shown), e.g., and without limitation, data servers. Computing device 186 is configured to store composite data 250 in memory 196.

In some embodiments, computing device 186 receives input data 195 including registration data 254 relating to the lifting model. In some other embodiments, computing device 186 receives input data 195 including registration data 256 relating to the bird strike model. Such registration data 254 and 256 facilitates aligning a plurality of three-dimensional datasets into the same coordinate system, thereby facilitating alignment of overlapping features or components of the portions of the three-dimensional representations of a surface as defined by the datasets. Regardless of the source, computing device 186 receives and converts composite data 250 into computer model 204 (shown in FIG. 5) to facilitate seamless integration of manufacturing and/or design analysis for efficient and accurate modeling. Computing device 186 receives registration data 254 and 256 from sources (not shown) such as, e.g., and without limitation, other software, layup tables, historical data from memory 196, and manually input data. Alternatively, computing device 186 receives registration data 254 and 256 from any source, including, without limitation, one or more of storage devices (not shown) resident within computing device 186 and external storage devices (not shown), e.g., and without limitation, data servers. Computing device 186 is configured to store registration data 254 and 256 in memory 196.

In other embodiments, computing device 186 receives input data 195 including layup table information 262 (shown in FIG. 5). In the exemplary embodiment, layup table information 262 includes, but is not limited to, a layup sequence, a ply orientation, a ply angle, a ply thickness, and a ply geometry of a composite component in unigraphical representation (e.g., unigraphical computer model 244). Alternatively, layup table information 262 may include any information relating to the composite component (e.g., composite component 100). Computing device 186 receives layup table information 262 from sources (not shown) such as, e.g., and without limitation, other software, layup tables, historical data from memory 196, and manually inputted data. Alternatively, layup table information 262 resides in one or more of storage devices (not shown) resident within computing device 186 and external storage devices (not shown), e.g., and without limitation, data servers. Computing device 186 is configured to store layup table information 262 in memory 196.

Figure 12:
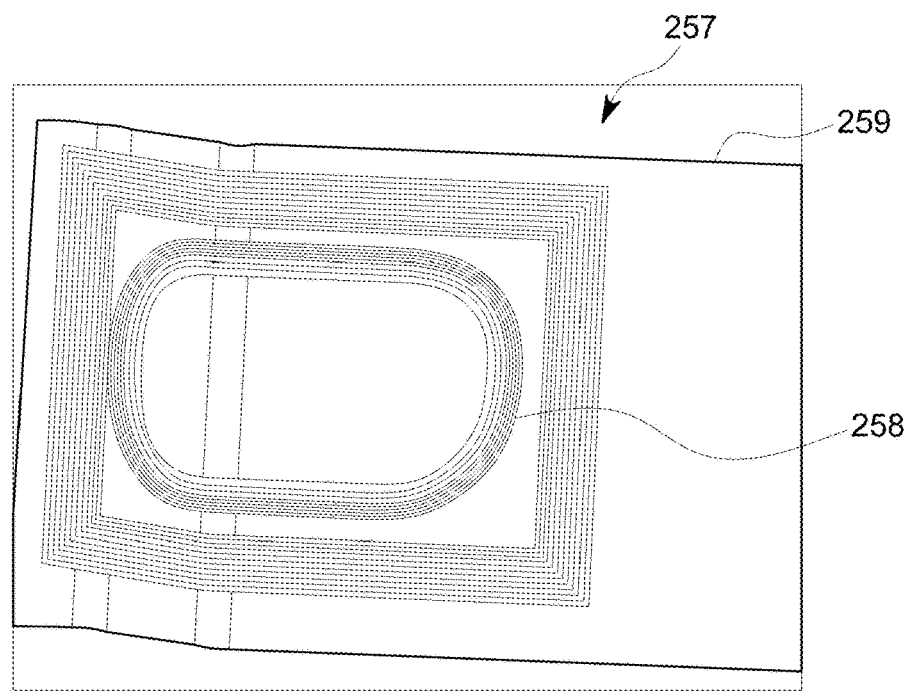
FIG. 12 is an exemplary two-dimensional model of another exemplary composite component.
Figure 13:
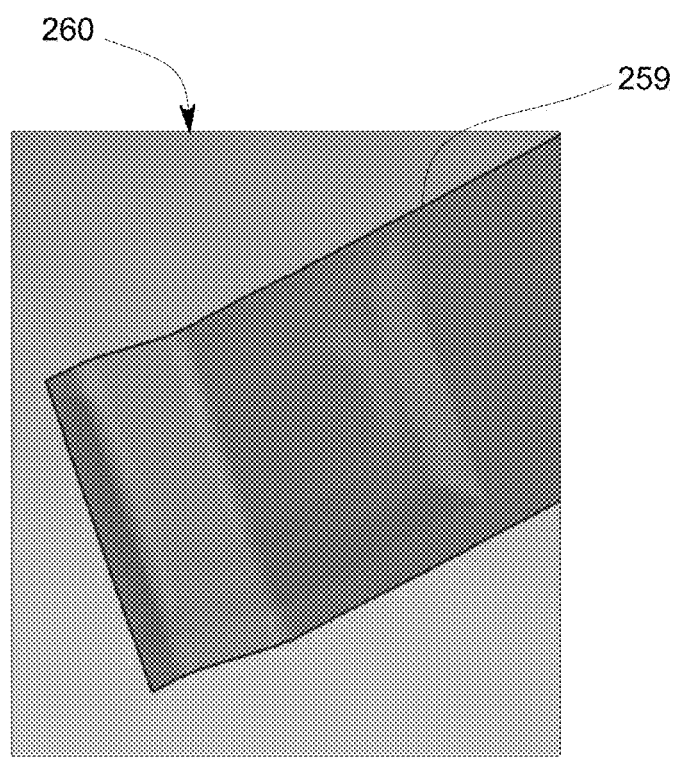
FIG. 13 is an exemplary three-dimensional model of the exemplary composite component shown in FIG. 12.

FIG. 12 is a two-dimensional computer model 257 of another exemplary composite component 259 that may be analyzed using computing system 184 (shown in FIG. 5). Two-dimensional computer model 257 includes a plurality of ply curved surfaces 258 similar to ply curved surfaces 208 (shown in FIG. 7) for exemplary composite component 259. FIG. 13 is a three-dimensional computer model 260 of exemplary composite component 259, e.g., to be used with a CAD or other computer modeling software or computer simulation software. Referring to FIGS. 12 and 13, in the exemplary embodiment, computing device 186 (shown in FIG. 5) receives input data 195 (shown in FIG. 5) including composite data 250 (shown in FIG. 5) associated with exemplary composite component 259 to analyze two-dimensional computer model 257. Moreover, computing device 186 is configured to generate three-dimensional computer model 260 based at least on input data 195 which represents two-dimensional model 257 and plurality of ply curved surfaces 258. In some embodiments, input data 195 also includes registration data 254 and/or 256, and computing device 186 is configured to generate three-dimensional computer model 260 at least based on composite data 250 and registration data 254 and 256. In other embodiments, input data 195 further includes layup table information 262, and computing device 186 is configured to generate three-dimensional computer model 260 at least based on composite data 250 and layup table information 262.

In some embodiments, computing device 186 is configured to register computer model 204 with input data 195 to further facilitate seamless integration of manufacturing and/or design analysis for efficient and accurate modeling. In registering computer model 204 with input data 195, computer model 204 is processed to include information associated with input data 195, including at least one of composite data 250, registration data 254, registration data 256, and layup table information 262. For example, a surface mesh (e.g., finite element mesh 230) is generated where each element of the mesh includes information associated with the composite ply for that element, and the material composition and material orientation of the composite ply for that element. Alternatively, a template surface mesh may be received and processed to register the relative computer model with the input data. In the exemplary embodiment, finite element mesh 230 is processed to include, for each element 232 of mesh 230, information associated with the composite ply of plies 104 (shown in FIG. 1) for that element, and the material composition and material orientation of the composite ply of plies 104 for that element.

Figure 14:
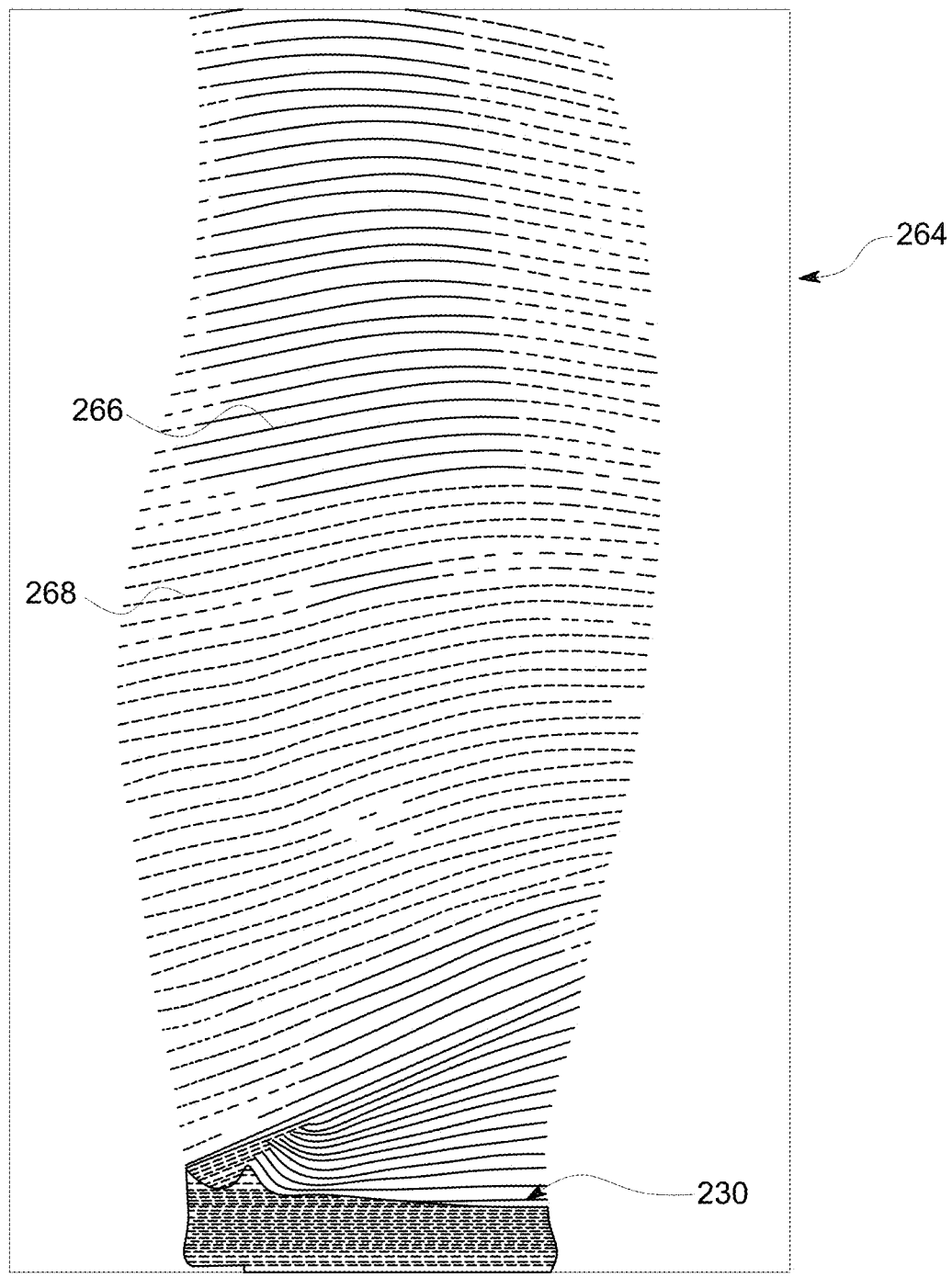
FIG. 14 is an exemplary computer model including the computer model shown in FIG. 5.

FIG. 14 is a computer model 264 including computer model 204 and finite element mesh 230 for registering computer model 204 with input data 195. In the exemplary embodiment, computing device 186 (shown in FIG. 5) is configured to generate a plurality of curves 266 and a plurality of element sets 268, each curve 266 passing along the layup direction of computer model 204 and through a center (not shown) of an element set 268, each element set 268 including at least one mesh element 232 of finite element mesh 230.

In generating curves 266 and element sets 268, curves 266 are generated through the center of each element set 268 as determined based on the location information for nodes and elements associated with the set. In the exemplary embodiment, computing device 186 receives node data 234 including location information for plurality of nodes 236 and including information associated with a node number (e.g., "N,2" where 2 is the node number) identifying a particular node and node coordinates (e.g., "−0.938040, −8.649883, 26.522189") identifying a location of the particular node. Moreover, computing device 186 receives location information for mesh elements 232 including information associated with an element number (e.g., "EN,2" where 2 is the element number) identifying a particular element and a node sequence (e.g., "2, 3, 248, 247") identifying nodes 236 that define the particular element. Computing device 186 receives location information for mesh elements 232 and node data 234 for nodes 236 from sources (not shown) such as, e.g., and without limitation, other software, layup tables, historical data from memory 196, and manually inputted data. Alternatively, location information for mesh elements 232 and node data 234 for nodes 236 reside in one or more of storage devices (not shown) resident within computing device 186 and external devices (not shown), e.g., and without limitation, data servers. Computing device 186 is configured to store location information for mesh elements 232 and node data 234 for nodes 236 in memory 196 (shown in FIG. 5).

In registering computer model 204, computing device 186 is configured to construe a geometry representing each element set 268. Computing device 186 is configured to utilize geometry operation and intersections to determine the particular ply that penetrates an element set. In the exemplary embodiment, computing device 186 is configured to receive input data 195, apply plurality of curves 266 to computer model 204 using geometry operation, and determine the particular ply that penetrates each element set 268 based on the intersection of the relative curve 266 and the geometry of computer model 204. Computing device 186 is configured to process finite element mesh 230 to include, for each mesh element 232, relative information from input data 195 associated the particular ply that penetrates the mesh element. In some embodiments, computer model 204 includes finite element mesh 230 and such relative information and is stored in memory 196 (e.g., in an enhanced layup table).

In some embodiments, input data 195 includes draping information 274 (shown in FIG. 5), and computing device 186 is configured to register draping information 274 with computer model 204. Computing device 186 receives draping information 274 from sources (not shown) such as, e.g., and without limitation, software configured to execute a triangulation of the model surface with small triangular mesh elements having a normal vector and three edge vectors to generate local fiber angles, which are different than the ply orientation angle (i.e., in areas where one or more ply is draped over another ply or plies). Generated local fiber angles may be used to analyze an angle deviation of a particular ply based on the intersection of the element sets and the three-dimensional model (i.e., determined when registering computer model 204 with input data 195). In the example embodiment, the angle deviation is associated with the difference between the local fiber angle and the ply orientation angle. In some embodiments, computing device 186 receives draping information 274 from sources (not shown) such as, e.g., and without limitation, other software, layup tables, historical data from memory 196, and manually inputted data. Alternatively, draping information 274 resides in one or more of storage devices (not shown) resident within computing device 186 and external storage devices (not shown), e.g., and without limitation, data servers. Computing device 186 is configured to store draping information 274 in memory 196.

In one embodiment, computing device 186 receives draping information 274 such as, but not limited to, a hand layup (HLU) draping angle. More particularly, computing device 186 is configured to generate a centroid point for a mesh element 232 of finite element mesh 230. Moreover, computing device 186 is configured to apply a transformation to nodes 236 and save input data 195 and inspection data (not shown) in memory 196. Computing device 186 is configured to map a zero degree global to a local zero degree vector. Still further, computing device 186 is configured to rotate zero degree on a first side of triangle mesh as a true angle. Computing device 186 is configured to determine an angle between local zero degree vector to first side triangle mesh after transformation. In some embodiments, the ply material orientation at that mesh element is replaced by the determined angle.

In another exemplary embodiment, computing device 186 receives draping information 274 such as, but not limited to, an automated fiber placement (AFP) draping angle. More particularly, computing device 186 is configured to map a zero degree global to a local zero degree vector. Moreover, computing device 186 is configured to determine an AFP tool path curve (not shown) to a predetermined point (not shown). Computing device 186 is configured to find a tangent of the tool path curve at the predetermined point. Still further, computing device 186 is configured to determine an angle between the tangent vector and the local zero degree vector. In an AFP draping analysis, computing device 186 is configured to determine an AFP tool path, and determine an angle deviation at a set location using a tangent along the AFP tool path. Moreover, computing device 186 is configured to store draping information 274 in memory 196.

Figure 15:
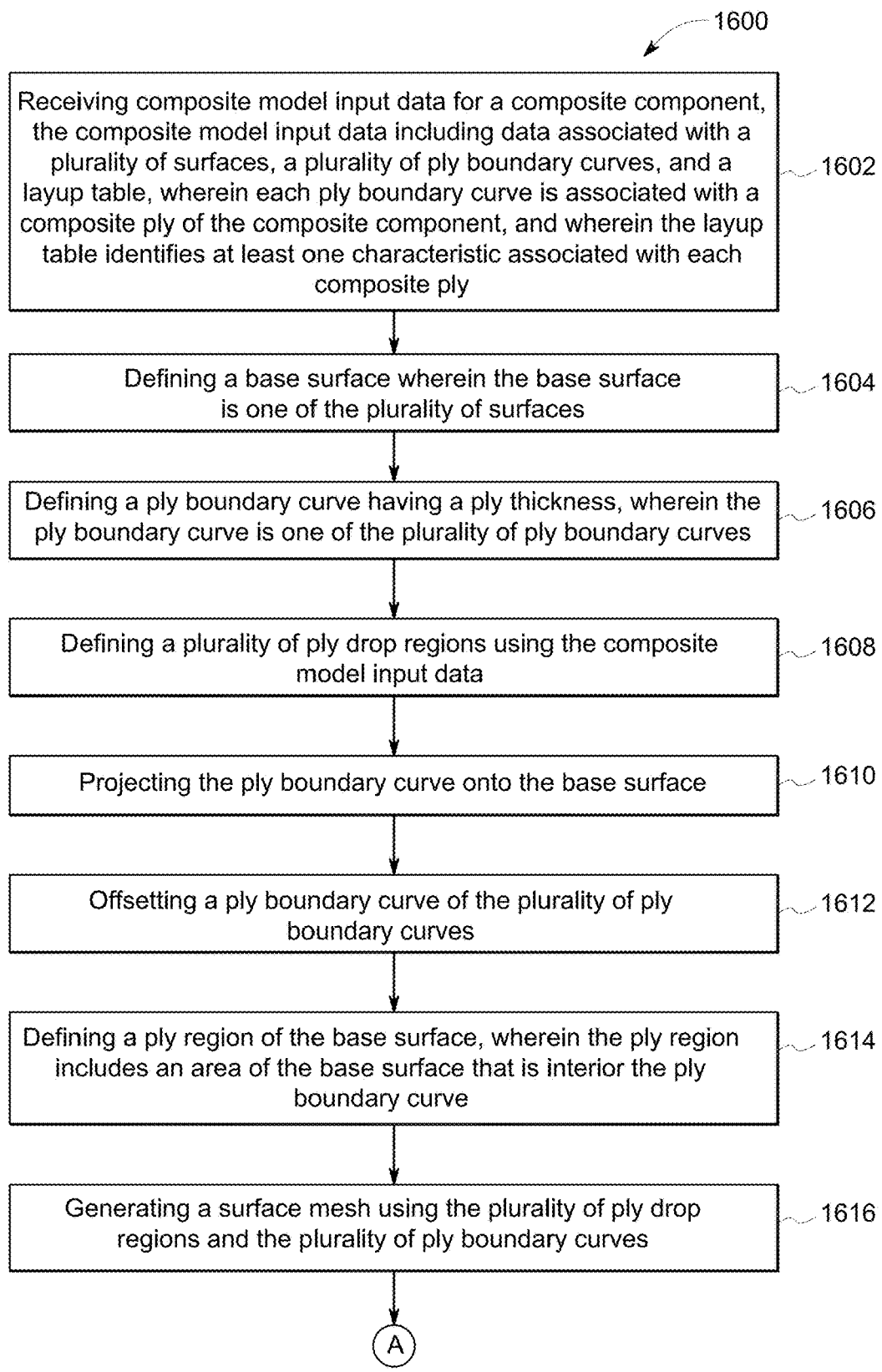
FIG. 15 is a flowchart illustrating an exemplary computer-implemented method of generating a computer model of a composite component.
Figure 16:
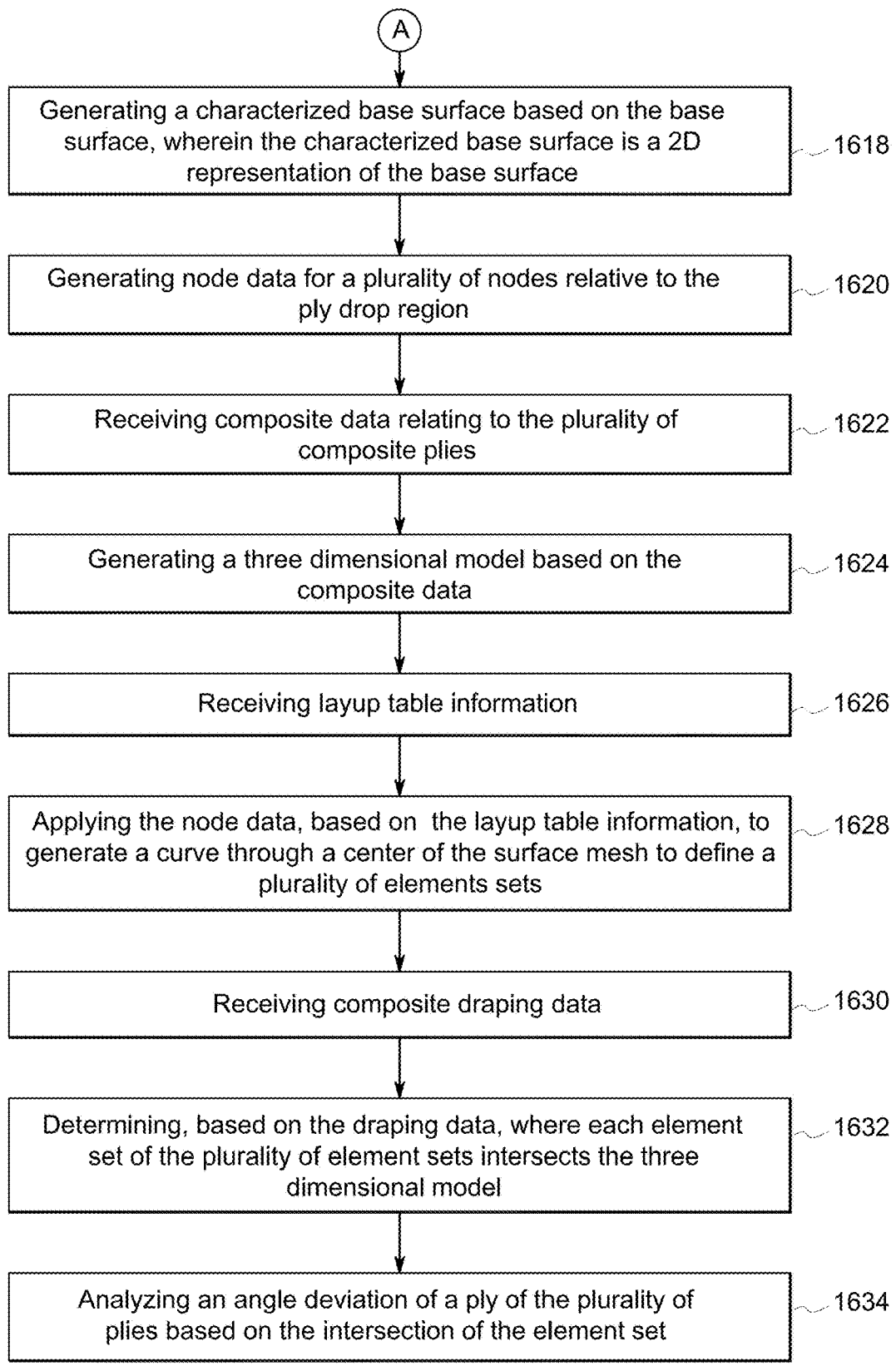
FIG. 16 is a continuation of the method shown in FIG. 15.

FIG. 15 is a flowchart illustrating an exemplary computer-implemented method 1600 for generating computer model 204 (shown in FIG. 8) of composite component 100 (shown in FIG. 1) by computing system 184 (shown in FIG. 5). FIG. 16 is a continuation of method 1600 of FIG. 15. Referring to FIGS. 15 and 16, method 1600 is configured to facilitate representation of physical ply behaviors of ply drop regions 224 (shown in FIG. 6). More particularly, method 1600 is configured to change and/or adjust a cross section of composite component 100 as compared to curves 266 and element sets 268 of plies 104.

Method 1600 includes receiving 1602 composite model input data 195 (shown in FIG. 5) for composite component 100. In exemplary method 1600, input data 195 includes characteristics associated with at least one of surfaces, ply curved surfaces, and a layup table. Method 1600 includes defining 1604 base surface 206 (shown in FIG. 4), in a three-dimensional model, e.g., model 204 (shown in FIG. 5). Alternatively, the base surface may include a base curve (not shown) in a two-dimensional model. In exemplary method 1600, the base surface is defined and/or derived from at least one of predetermined and/or known design constraints, previous engineering analysis, historical analysis, and a lookup table.

Method 1600 also includes defining 1606 ply curved surface 208 (shown in FIG. 6) including ply thickness 210 (shown in FIG. 6). In exemplary method 1600, ply curved surface 208 is defined along layup direction 212 (shown in FIG. 6). Moreover, in exemplary method 1600, ply curved surface 208 is associated with at least one of plies 104 (shown in FIGS. 1 and 2) and, more particularly, ply curved surface 208 at least partially defines the boundaries of a ply 104 and may be referred to as a ply boundary curve.

Method 1600 further includes defining 1608 a plurality of ply drop regions 224 (shown in FIG. 6). Method 1600 includes projecting 1610 ply boundary curve 208 onto base surface 206. In exemplary method 1600, ply boundary curve 208 is defined and/or derived from at least one of predetermined and/or known design constraints, previous engineering analysis, historical analysis, and a lookup table.

Method 1600 also includes offsetting 1612 the projected ply curved surface outwardly from and along the base surface to define offset ply curved surface 218 (shown in FIG. 6). In the exemplary method, offset ply curved surface 218 at least partially defines the boundaries of the offset ply curved surface and may be referred to as an offset ply boundary curve. Moreover, in the exemplary method, ply drop region 224 includes area 226 (shown in FIG. 6) that is exterior ply curve 208 and interior offset ply boundary curve 218. Still further, method 1600 includes defining 1614 ply region 220 (shown in FIG. 6). Ply region 220 includes area 222 (shown in FIG. 6) that is interior the offset ply boundary curve surface 218.

Method 1600 further includes generating 1616 a surface mesh such as finite element mesh 230 (shown in FIG. 8) based at least on ply drop region 224 and ply boundary curve 208. Method 1600 includes generating 1618 characterized nodes 236 (shown in FIG. 8) relative to base surface 206. In the exemplary embodiment, the characterized base surface is a two-dimensional representation of base surface 206. Moreover, exemplary method 1600 includes generating 1620 node data 234 (shown in FIG. 8) relative to ply drop region 224, node data 234 including plurality of nodes 236.

Method 1600 further includes receiving 1622 composite data 250 relating to the plurality of plies 104 (shown in FIG. 1). Method 1600 includes generating 1624 three-dimensional model 204 based on composite data 250. Moreover, method 1600 includes processor 194 receiving 1626 layup table information 262. Method 1600 also includes applying 1628 node data 234 based on layup table information 262 to generate curves 266 (shown in FIG. 14) through a center of finite element mesh 230 to define plurality of element sets 268. More particularly, node data 234 include information associated with the location of each node for finite element mesh 230, and curves 266 are generated through the center of mesh elements 232 (shown in FIG. 14) of finite element mesh 230 to define each element set 268 based on the location information for the nodes and elements associated with the set. Method 1600 further includes receiving 1630 composite draping information 274 (shown in FIG. 5) and determining 1632 using geometry operations and intersections where each element set 268 intersects three-dimensional model 204. In determining 1632 where each element set 268 intersects model 204, curves 266 are applied to computer model 204 using geometry operation, and the particular ply that penetrates each element set 268 is determined based on the intersection of the relative curve 266 and the geometry of computer model 204. Method 1600 also includes analyzing 1634 an angle deviation of a ply 104 based on the intersection of the element set. The angle deviation is associated with the difference between the local fiber angle and the ply orientation angle, where the local fiber angle is generated by executing a triangulation of the model surface with small triangular mesh elements having a normal vector and three edge vectors and the ply orientation angle is received in the layup table information.

The embodiments described herein facilitate increasing efficiency and reducing costs for generating a computer model of a composite component. More particularly, the embodiments described herein facilitate generating a computer model for enhanced designs of a finite element mesh for a layup sequence of a plurality of plies to form the composite component. More particularly, the embodiments described herein are configured to generate a computer model for three-dimensional ply curved surfaces for a layup sequence of plies on a tooling surface. Moreover, the embodiments described herein apply draping information to the computer model. More particularly, the draping information includes at least a manufacturing layup sequence, material property information, and information associated with draping effects including, e.g., the angle deviation of plies of the composite component. The embodiments described herein can be used for direct 3D solid element generation and/or 3D layered/piled shell geometries.

A technical effect of the systems and methods described herein includes at least one of: (a) generating a computer model of a composite component; (b) accounting for ply drop regions during a computer modeling stage of the composite component; (c) iteratively improving a computer aided design process by a computer model; (d) applying draping information to the computer model for analyzing the angle deviation of plies of the composite component; (e) providing a prediction for a failure mode of the composite component; and (f) increasing efficiency and decreasing costs for computer modeling of components.

Processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc read-only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, e.g., but not be limited to, a scanner. Furthermore, in the exemplary embodiment, additional output channels may include, but not be limited to, an operator interface monitor. The above examples are exemplary only, and thus are not intended to limit in any way the definition and/or meaning of the term processor.

Exemplary embodiments of a computing device and computer implemented methods for generating a computer model of a composite component are provided. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiments may be implemented and utilized in connection with many other composite laminate applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for generating a composite component using a computing device including at least one processor coupled to a memory device, the computing device being coupled to a layup device including a mandrel, the composite component having a base surface and a predefined ply curved surface formed by a ply of a plurality of composite plies, each ply of the plurality of composite plies having a ply thickness, said method comprising:
   defining a ply drop region of the base surface;
   generating a surface mesh based on the ply drop region and the ply curved surface;
   generating node data including a plurality of node points relative to the ply drop region;
   receiving composite data relating to the plurality of composite plies;
   generating a three dimensional model based on the composite data;
   receiving layup table information;
   applying the node data, based on the layup table information, to generate a curve through a center of the surface mesh to define a plurality of element sets;
   generating a manufacturing layup sequence for the plurality of composite plies
   receiving composite draping data, wherein the composite draping data includes the manufacturing layup sequence;
   determining, based on the draping data, where each element set of the plurality of element sets intersects the three dimensional model;
   analyzing an angle deviation of a ply of the plurality of plies based on the intersection of the element sets; and
   coupling the plurality of composite plies to the mandrel according to the manufacturing layup sequence.

2. The method of claim 1, wherein receiving composite data comprises receiving registration data relative to a lifting model.

3. The method of claim 1, wherein receiving composite data comprises receiving registration data relative to a bird strike model.

4. The method of claim 1, wherein generating the three dimensional model comprises using composite data which represents a two dimensional model of the ply curved surface.

5. The method of claim 1, wherein receiving layup table information comprises receiving information relating to at least one of layup sequence, a ply orientation, a ply angle, a ply thickness, and a ply geometry.

6. The method of claim 1, wherein receiving composite draping data comprises receiving a hand layup draping angle.

7. The method of claim 1, wherein receiving composite draping data comprises receiving an automated fiber placement draping angle.

8. The method of claim 1, wherein analyzing the angle deviation comprises determining a centroid location of each element set of the plurality of element sets.

9. A device for generating a composite component, the composite component including a base surface, a ply curved surface, and a plurality of composite plies, said device comprising:
  a computing device comprising
    a memory device configured to store a characteristic of the composite component;
    an interface coupled to said memory device and configured to receive said characteristic of the composite component;
    a processor coupled to said memory device and said interface device, said processor configured to:
      define a ply drop region of the base surface;
      generate a surface mesh based on the ply drop region and the ply curved surface;
      generate node data including a plurality of node points relative to the ply drop region;
      receive composite data relating to the plurality of composite plies;
      generate a three dimensional model based on the composite data;
      receive layup table information;
      apply the node data, based on the layup table information, to generate a curve through a center of the surface mesh to define a plurality of element sets;
      generating a manufacturing layup sequence for the plurality of composite plies
      receive composite drape data, wherein the composite draping data includes the manufacturing layup sequence;
      determine, based on the drape data, where each element set of the plurality of element sets intersects the three dimensional model; and
      analyze an angle deviation of a ply of the plurality of plies based on the intersection of the element sets; and
    a layup device coupled to the computing device, the layup device comprising a mandrel and a tool configured to apply manufacturing processes to the plurality of composite plies coupled to the mandrel of the layup according to the manufacturing layup sequence.

10. The device of claim 9, wherein the composite data includes registration data relative to a lifting model.

11. The device of claim 9, wherein the composite data includes registration data relative to a bird strike model.

12. The device of claim 9, wherein the layup table information includes information relating to at least one of layup sequence, a ply orientation, a ply angle, a ply thickness, and a ply geometry.

13. The device of claim 9, wherein the composite draping data includes a hand layup draping angle.

14. The device of claim 9, wherein the composite draping data includes an automated fiber placement draping angle.

15. The device of claim 10, wherein said processor is further configured to analyze the angle deviation through determining a centroid location of each element set of the plurality of element sets.

* * * * *